July 15, 1969    J. E. HALL ET AL    3,455,594
AERODYNAMIC SPOILER FOR AUTOMOTIVE VEHICLES
Filed March 22, 1967

INVENTORS
James E. Hall
Jerry R. Mrlik
James G. Musser
Frank J. Winchell
By D. L. Ellis
ATTORNEY United States Patent Office 3,455,594
Patented July 15, 1969

3,455,594
AERODYNAMIC SPOILER FOR AUTOMOTIVE
VEHICLES
James E. Hall, Midland, Tex., and Jerry R. Mrlik and
James G. Musser, Birmingham, and Frank J. Winchell,
Bloomfield Hills, Mich.; said Mrlik assignor to General
Motors Corporation, Detroit, Mich., a corporation of
Delaware
Filed Mar. 22, 1967, Ser. No. 625,234
Int. Cl. B62c 1/00, 1/06; F16d 57/00
U.S. Cl. 296—1                                    4 Claims

ABSTRACT OF THE DISCLOSURE

An aerodyamic spoiler member operative to experience substantial aerodynamic anti-lift forces in a relatively moving airstream is mounted on the vehicle by support columns directly attached to the unsprung mass of the vehicle by connection to the two rear wheel support hubs, whereby aerodynamic anti-lift forces on the spoiler may be applied to the ground-engaging wheels for improved traction and maneuverability of the vehicle without loading the sprung chassis mass and deflecting the chassis suspension.

---

It has previously been proposed to provide automotive vehicles with aerodynamic spoiler members operative to apply substantial aerodynamic anti-lift forces to the vehicle to improve the traction of its wheels and its general maneuverablity, particularly during higher speeds of operation. Such prior proposals have uniformly utilized aerodynamic spoiler members mounted directly to the vehicle body and chassis and it has been found that such arrangements have the effect of forcing the body and chassis downwardly on its resilient suspension to degrees altering the chassis roll and other performance characteristics designed into the suspension.

The primary object of this invention is thus to provide an aerodynamic spoiler arrangement for an automotive vehicle wherein aerodynamic anti-lift and braking forces are advantageously applied to the vehicle without disturbing the vehicle suspension. Another object of this invention is to provide an aerodynamic spoiler device mounted directly to selected ground-engaging wheel assemblies of the vehicle so that the aerodynamic anti-lift and braking forces are applied to such wheel assemblies without loading the vehicle chassis on the chassis suspension and deflecting the latter. A further object of this invention is to provide an aerodynamic spoiler arrangement for an automotive vehicle including a spoiler member mounted in the airstream above the vehicle by a pair of strut-stabilized support columns extending generally vertically from respective ground-engaging wheel assemblies, and including provisions in the mounting of the member on the columns whereby the spoiler member may be adjusted in the airstream for selected amounts of aerodynamic anti-lift force.

Figure 1:
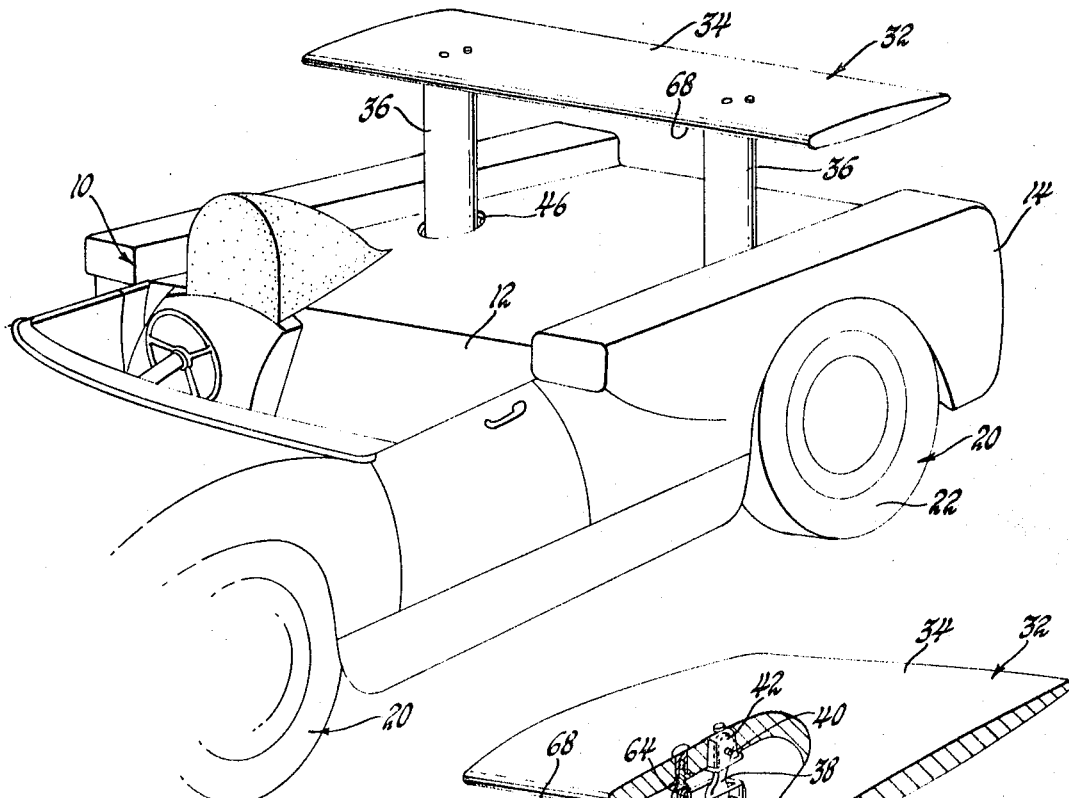
Figure 2:
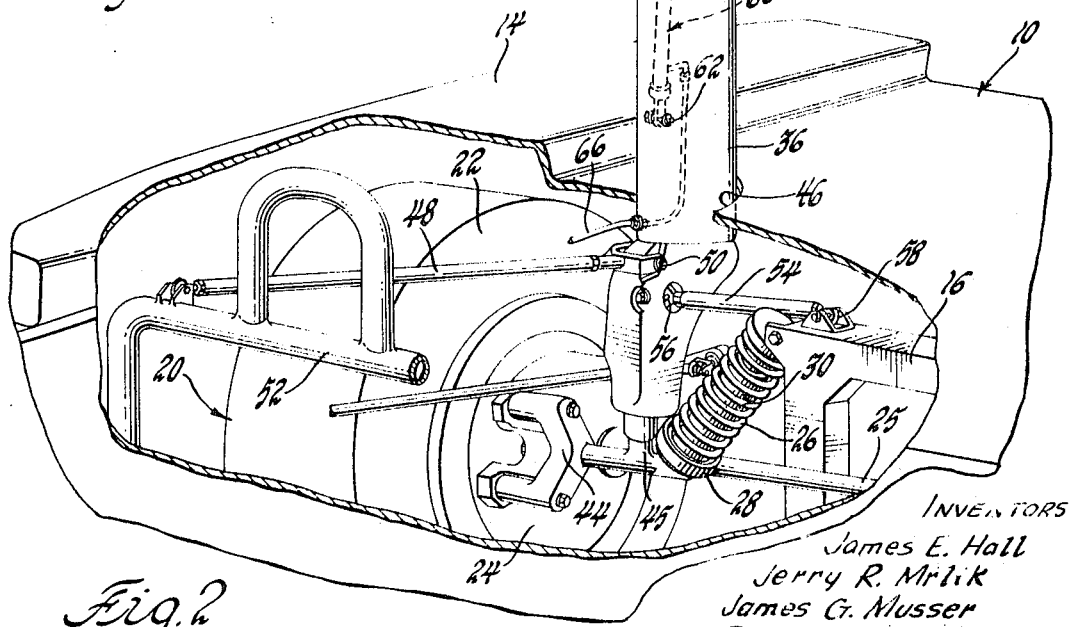

These and other objects and advantages of the invention will be readily apparent from the following specification and drawings wherein:

FIGURE 1 is a fragmentary perspective view of an automotive vehicle including an aerodynamic spoiler arrangement according to the invention; and FIGURE 2 is an enlarged partially broken away view of a portion of FIGURE 1.

Referring now to FIGURE 1, an automotive vehicle of the open sports car type includes a body 10 including a passenger compartment 12. As illustrated, body 10 is of the type including separate body shell or skin and chassis components of known character, the shell, designated 14, being of sheet metal or plastic construction, and being mounted on the chassis, part of which latter appears in FIGURE 2 and is designated 16. At the corners of the chassis are the usual forward and rearward pairs of ground-engaging wheel assemblies 20, each wheel assembly being of generally conventional construction and including a wheel 22 rotatable on a wheel support member or hub 24. In the vehicle shown, each of the wheel assemblies are provided with independent suspension for the chassis. The suspension arrangements, forming per se no part of the invention, are of a known construction includig upper and lower control arms, not shown, each pivoted to the chassis 16 at one end and at the opposite end to the respective wheel hub 24, in a manner permitting vertical swinging movement of the wheel assemblies relative to the chassis. In the vehicle shown, the rear wheels 22 are the driving wheels with drive half shafts, as at 25, extending thereto from the power transmission and through the wheel hubs 24. Connected between the hub 24 of each wheel assembly and the chassis is a coil suspension spring 26 seated on the hub 24 at 28 and similarly on the chassis by any conventional means, not shown. Arranged concentrically within the spring is the usual viscous damper strut 30 also mounted at opposite ends to the hub 24 and chassis. The springs 26, together with whatever further suspension stiffness controls that are provided, are of course operative to resiliently support the vehicle body 10 on the various ground-engaging wheels and to enable forced deflection at predetermined rate of the body relative to the wheels during roadway operation.

An aerodynamic spoiler arrangement according to this invention and designated generally as 32 is provided for improved vehicle traction and maneuverability and includes a spoiler member 34 placed for operation in the airstream above the rearward portion of the body 10. The illustrated spoiler member resembles the wing of an aircraft vehicle but is preferably of a neutral lift airfoil section in being generally symmetrical about its section chord line; i.e., of zero camber. The spoiler 34 is mounted adjacent each of its ends on a support column 36 extending generally vertically of body 10 from a respective hub 24, FIGURE 2. The mounting of the spoiler on each column is of pivoting nature including a hinge member 38 fixed at the upper end of column 36 and pinned at 40 within a housing 42 fixed to the spoiler member. The lower end of each support column 36 is attached to a vertically extending arm 45 of a support knuckle 44 fixed by bolts or the like to the respective hub 24. Rubber bushing or similar means may be provided between the vertical arm of the knuckle and the lower end of column 36 to dampen vibration between the column and the wheel hub. In the embodiment shown, the knuckle 44 provides a common wheel mount for a column 36 and for the suspension spring 26 and damper strut 48, other arrangements, of course, being practical for use. As shown in FIGURE 2, the body shell 14 is provided with suitable openings 46 allowing projection of each column 36 therethrough without any vertically restraining interengagement or attachment therebetween.

For each support column 36, there is provided an arrangement of stabilizing struts including a generally longitudinally extending strut 48 pivoted by a clevis to column 36 at 50, and pivoted at its other end to a transversely extending chassis member 52 immediately rearward of the passenger compartment. A further transverse strut 54 is similarly pivotally secured at 56 to the support column and at its other end to the chassis 16 at 58. Struts 54 and 48 are swingable on the chassis during any roadway or otherwise induced deflection between body 10 and columns 36 to stabilize the columns with respect to the body in generally fixed transverse and longitudinal relationship therewith.

In operation, the spoiler member 34 is adjustable to various angles of attack in the airstream about body 10 by pivoting on hinge members 38, whereby to present a variable frontal profile to the airstream to thereby experience variable downward anti-lift forces. For selecting the desired anti-lift forces on the spoiler, an actuator 60 in the form of an hydraulic cylinder and piston is mounted in one support column 36 by a pivot 62, the piston shaft 63 of the actuator being secured to the spoiler by a pivot connection 64. An hydraulic line 66 leads from actuator 60 to suitable master cylinder actuating apparatus adjacent the passenger compartment 12 and controllable by the vehicle operator as by a foot pedal or the like. Spoiler 34 preferably has its column pivot pins 40 located rearwardly of the mean aerodynamic chordwise center of the member so that the presence of a relatively moving airstream forces the spoiler to assume a high negative angle of attack; i.e., the leading edge 68 of the spoiler is pivoted downwardly about pins 40. The limit or maximum of such downward or negative angle of attack may be imposed by bottoming of the piston of actuator 60, or by any other suitable means. Thus, the spoiler 34 normally exhibits a substantial frontal profile to the airstream causing it to experience downwardly and rearwardly directed aerodynamic forces, the anti-lift forces being transferred through columns 36 directly to knuckles 44 on the wheel hubs 24, and the drag or braking forces in the longitudinal direction being applied to struts 48. The anti-lift forces applied to knuckles 44, of course, enhance the traction in wheels 22 and improve the maneuverability of the vehicle, as for example during high speed cornering or in the presence of substantial airstream lifting forces on the rear of body 10. However, it is seen that these anti-lift forces in no way cause downward deflection of the chassis and the resilient suspension of the rear wheel assemblies, thus to preserve the designed chassis roll and other performance characteristics of the general suspension scheme.

When it is desired to lessen or remove the anti-lift forces imposed by the spoiler, actuator 60 is pressurized to force the leading edge 68 upwardly about pivot pins 40 and reduce the negative angle of attack and the frontal profile exhibited to the airstream. It will, of course, be appreciated that the above described arrangement of the spoiler 34 may be reversed to that the normal position of the spoiler in the airstream is at substantially zero angle of attack to normally impose no substantial anti-lift force, and employing the actuator 60 to increase the negative angle of attack and the anti-lift forces on wheel 22 to selected amounts when desired.

Having thus described the invention what is claimed is:

1. In an automotive vehicle including a plurality of ground-engaging wheel assemblies, a chassis, and suspension means mounting said chassis on said wheel assemblies, an aerodynamic spoiler arrangement, comprising, an aerodynamic spoiler member for placement in the relatively moving airstream about the vehicle and having an aerodynamic shape adapted to experience substantial anti-lift forces imposed by the airstream, and means independent of said chassis placing said member in a location subject to the airstream and supporting the same directly on selected ones of said wheel assemblies whereby aerodynamic anti-lift forces on said member are applied directly to such wheel assemblies without transferral through said suspension means.

2. The combination recited in claim 1 wherein said mounting means include support column means extending generally vertically of the vehicle from connection to selected said wheel assemblies to mount said member in the airstream above the chassis, and stabilizing strut means swingably interconnected between said column means and said chassis.

3. The combination recited in claim 1 wherein said mounting means includes means permitting movement of said member to vary the aerodynamic shape thereof presented to the airstream to vary the anti-lift forces on said member, and actuating means for selectively so moving said member.

4. In an automotive vehicle including a plurality of wheel assemblies each having a ground-engaging wheel and a wheel support member, a chassis, and resilient suspension means mounting said chassis on said wheel support members, an aerodynamic spoiler arrangement, comprising, an aerodynamic spoiler member for placement in the relatively moving airstream about the vehicle and having an aerodynamic shape adapted to experience substantial anti-lift forces imposed by the airstream, a pair of generally vertically extending support columns spaced transversely of the vehicle, means adjacent the upper end of each of said columns pivotally mounting said member thereon, means mounting the lower end of each of said columns to a respective wheel support member, aerodynamic anti-lift forces on said member being applied through said support columns directly to said wheel support members without transferral to said chassis and said suspension means, actuating means mounted in one of said columns and operable to pivot said member on said columns to vary the aerodynamic shape of said member presented to the airstream, and stabilizing strut means swingably interconnected between each of said support columns and said chassis.

References Cited

UNITED STATES PATENTS

| | | | |
|---|---|---|---|
| 2,932,370 | 4/1960 | Kraus | 296—1 |
| 1,717,515 | 6/1929 | Linton | 180—1.15 |
| 1,266,191 | 5/1918 | Adsit | 296—1 |

PHILIP GOODMAN, Primary Examiner

U.S. Cl. X.R.

180—1; 188—87

PO-1050
(5/69)

UNITED STATES PATENT OFFICE
CERTIFICATE OF CORRECTION

Patent No. __3,455,594__          Dated __July 15, 1969__

Inventor(s) __James E. Hall et al__

It is certified that error appears in the above-identified patent and that said Letters Patent are hereby corrected as shown below:

Column 1, lines 4 through 8, should read --
James E. Hall, Midland, Tex., and Jerry R. Mrlik and James G. Musser, Birmingham, and Frank J. Winchell, Bloomfield Hills, Mich.; said Mrlik, Musser and Winchell assignors to General Motors Corporation, Detroit, Mich., a corporation of Delaware. Column 2, line 12, "ig" should be -- ing --. Column 3, line 43, "to" should be -- so --. Column 4, References Cited, "Kraus" should be -- Kraus et al --.

SIGNED AND
SEALED
APR 28 1970

(SEAL)
Attest:

Edward M. Fletcher, Jr.
Attesting Officer

WILLIAM E. SCHUYLER, JR.
Commissioner of Patents